United States Patent [19]
Angelini et al.

[11] 3,975,681
[45] Aug. 17, 1976

[54] ELECTRODE FOR MEASURING THICKNESS OF DIELECTRIC LAYERS ON CONDUCTIVE SUBSTRATES

[75] Inventors: Dominic J. Angelini; Philip G. Perry, both of Webster, N.Y.

[73] Assignee: Xerox Corporation, Stamford, Conn.

[22] Filed: Jan. 10, 1975

[21] Appl. No.: 540,226

[52] U.S. Cl. .............................. 324/71 R; 204/1 T; 204/195 R; 324/54
[51] Int. Cl.² .................. G01N 27/02; G01N 27/26
[58] Field of Search ............ 324/71 R, 54; 204/1 T, 204/195 R

[56] References Cited
UNITED STATES PATENTS

| | | | |
|---|---|---|---|
| 2,345,498 | 3/1944 | Perley | 204/195 |
| 2,497,052 | 2/1950 | Williams | 324/30 R |
| 2,894,882 | 7/1959 | Strodtz | 204/1 |
| 3,293,155 | 12/1966 | Stone | 204/1 |
| 3,315,270 | 4/1967 | Hersch | 204/1 |
| 3,445,366 | 5/1969 | Vermeer | 204/195 |

*Primary Examiner*—R. V. Rolinec
*Assistant Examiner*—Vincent J. Sunderdick

[57] ABSTRACT

An electrode structure comprising a tube of substantially electrically insulating material such as glass, having a rounded tip of substantially electrically insulating material such as rubber, which tip has a capillary opening therethrough, encloses a metallic cathode and liquid electrolyte, and that electrode structure is placed with the tip and capillary opening in contact with the surface of a sample conductive substrate having an electrical barrier layer thereon whose thickness is to be measured, and electrical potential is applied between the cathode and sample conductive substrate, which is the anode in the system, and the thickness of the electrical barrier layer is measured as a function of the highest applied voltage that does not produce a pronounced increase in current flow in the system.

16 Claims, 3 Drawing Figures

ELECTRODE FOR MEASURING THICKNESS OF DIELECTRIC LAYERS ON CONDUCTIVE SUBSTRATES

This invention relates in general to systems for measuring the thickness of layers supported on conductive substrates, and more particularly to an electrode system for the non-destructive measurement of the thickness of barrier layers, such as oxide layers, on metallic substrates.

There are numerous situations wherein relatively thin layers of material are found on conductive substrates, whether they are formed by natural or man-made processes, and in various situations it is desirable to have a knowledge of thickness of such layers. For example, such coatings include anodized or galvanized coatings, naturally formed oxide coatings, or other natural or man-made coatings. One well known example is an aluminum oxide ($Al_2O_3$) barrier layer at the surface of metallic aluminum.

Such coatings on conductive substrates, and particularly barrier layers on metallic substrates, have utility in photo-conductive plates used in xerography, the copying process wherein the surface of a layer of photoconductive insulating material on a conductive backing is uniformly electrostatically charged, then imagewise exposed to create an electrostatic latent image on the surface of the photoconductive layer, which is then developed by contact with an electroscopic marking material called toner. Xerography was first described in Carlson U.S. Pat. No. 2,297,691. More recent xerographic apparatus uses a rotating xerographic plate in the form of a cylindrical drum, as described for example in U.S. Pat. No. 3,062,109.

As indicated above, the xerographic plate typically comprises a conductive backing having a layer of photoconductive insulating material thereon, and the aforementioned barrier layer is located on the conductive backing between the backing per se and the layer of photoconductive insulating material. These barrier layers are partial barriers to the migration of electrical charge to and from the photoconductor. For example, during electrostatic charging of the surface of the photoconductor layer, the barrier layer prevents unwanted leaking of charge from the photoconductor to the conductive backing plate, thereby allowing the photoconductor to hold its charge. Similarly, the barrier layer keeps charges from flowing from the conductive backing plate into the photoconductor thereby maintaining the electrostatically created electrical field across the thickness of the photoconductor layer in electrostatically imaged areas. It is therefore seen that the barrier layer is in some respects functionally similar to the gap in a capacitor, and it will be appreciated that the thickness of such barrier layers would be desirable to carefully control where uniformly responsive xerographic plates are desired. Of course important to controlling the thickness of such barrier layers is a knowledge of their thickness.

One method of measuring the thickness of such layers was reported in Hunter, M.S. and Fowle, P., "Determination of Barrier Layer Thickness of Anodic Oxide Coatings," J. Electrochem. Soc., Vol. 101, No. 9, Sept., 1954, pp. 481–485. Hunter and Fowle used equipment which includes a direct current source, a voltmeter, a millammeter, and an electrolyte bath into which a specimen is immersed as the anode, and the cathode in the bath also preferably comprises the material of the specimen. Hunter and Fowle used a three percent tartaric acid solution having a pH of 5.5, adjusted with ammonium hydroxide, as the electrolyte. Hunter and Fowle learned that an approximation of barrier layer thickness on an oxide coated sample may be made by observing the current flow with increasing voltage in an electrolyte that forms a barrier type coating. As voltage increases, leakage current rises very slowly until the voltage corresponding to the thickness of the barrier is approached, and when appreciable current starts to flow small voltage increments produce large increases in current. According to Hunter and Fowle, the approximate thickness of the barrier layer in Angstrom units is approximately 14 times the highest voltage that does not produce a pronounced rise in current flow. However, it will be appreciated that the Hunter and Fowle method requires immersion of the sample-anode into a bath of electrolyte and that the characteristics of the sample-anode are necessarily changed throughout the portion thereof which is immersed in the electrolyte.

In another known method which makes use of some of the basic principles of the Hunter and Fowle method, the thickness of barrier layers on large area conductive substrates was measured by first placing an annular, circular or square, cell mold onto the surface of the sample conductive plate whose barrier layer thickness is to be measured, then filling the mold with the electrolyte, then connecting the anode wire to the sample conductive plate and inserting the cathode into the electrolyte liquid in the cell mold. However that system requires preparation of the aforementioned special cell molds, substantially changes the characteristics of the barrier layer by anodization and contamination in the area where the electrolyte is in contact with the surface of the conductive substrate, Furthermore, placement of the cell mold and electrolyte system onto the surface of the conductive plate to be tested is quite time consuming and cumbersome, and contributes to further contamination of the sample since it requires an adhesive material such as silicone stopcock grease to secure the cell in position on a substrate.

While the aforementioned systems for measuring the thickness of layers on conductive substrates are known, there is still a need for non-destructive methods for measuring the thickness of such layers, and methods which do not require the cumbersome techniques characteristic of the prior art. Other thickness measuring devices and electrode structures are known, for example such as those disclosed in Van Neuten U.S. Pat. No. 3,657,645, and in Cary et al U.S. Pat. No. 2,256,733, but those systems are not suitable for use in the same applications as the present invention, and cannot provide the advantages which accompany the present invention.

BRIEF SUMMARY OF THE INVENTION

It is, therefore, an object of this invention to provide an electrode system for measuring the thickness of layers on conductive substrates, which system overcomes the above-noted disadvantages and fulfills the aforementioned needs.

It is another object of this invention to provide a novel electrode structure.

It is another object of this invention to provide a novel electrode system for measuring the thickness of electrical barrier layers on metallic substrates, which electrode system is quickly applicable to the layer being measured, nondestructive to the layer being measured, and re-usable.

The foregoing objects and others are accomplished in accordance with the present invention wherein a novel electrode structure comprising a tube of substantially electrically insulating material such as glass, having a rounded tip of substantially electrically insulating material such as rubber, which tip has a capillary opening therethrough, encloses a metallic cathode and liquid electrolyte, and that electrode structure is placed with the tip and capillary opening in contact with the surface of a sample conductive substrate having an electrical barrier layer thereon whose thickness is to be measured, and an electrical potential is applied between the cathode and sample conductive substrate, which is the anode in the system, and the thickness of the electrical barrier layer is measured as a function of the highest applied voltage that does not produce a pronounced increase in current flow in the system.

BRIEF DESCRIPTION OF THE DRAWINGS

For a better understanding of the invention as well as other objects and further features thereof, reference is made to the following detailed disclosure of preferred embodiments of the invention taken in conjunction with the accompanying drawings thereof, wherein.

DETAILED DESCRIPTION OF THE PREFERRED EMBODIMENTS

Figure 1:
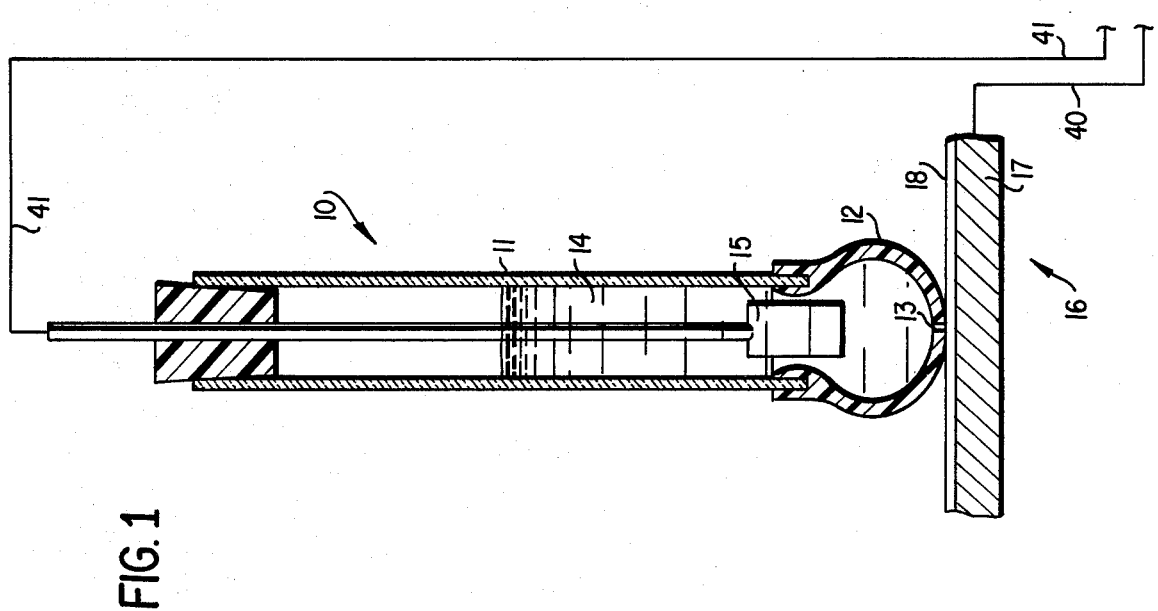
FIG. 1 is a partially schematic, cross-sectional view of the advantageous electrode structure of the present invention.

The electrode structure 10 of the present invention is illustrated in FIG. 1 wherein exterior tube 11 comprises a substantially electrically insulating material such as glass, plastic, ceramic, quartz, or any other suitable material, with a rounded tip 12, also of substantially electrically insulating material, and preferably comprising a flexible substantially electrically insulating material such as rubber, for example silicone rubber like RTV-21 silicon rubber molding compound available from the General Electric Company, or any other substantially electrically insulating rubber material. Rubber materials are preferred because of their compressibility which facilitates good surface contact with a substrate. However other semi-rigid materials such as plasticized PVC or other polymeric materials may be used. Tip 12 also has in the end thereof a capillary opening 13. Further alternate embodiments of the tip having one or more capillary openings therein may include any porous material which allows the electrolyte to come into electrical contact with the sample; for example, a felt tip may be used. Tube 11 and tip 12 contain an electrolyte 14, and capillary opening 13 in tip 12 is sufficiently large to allow electrical contact between the electrolyte 14 within tip 12 and a surface which is placed in contact with tip 12 and opening 13, but capillary opening 13 is preferably sufficiently small so that surface tension forces as well as any small vacuum above electrolyte 14 prevents the electrolyte 14 from leaking out of tip 12 through capillary opening 13. The capillary opening 13 is usually of a diameter less than about 1/16 of an inch, and preferably not greater than about 1/64 of an inch. Within tube 11 and tip 12, and immersed in the electrolyte 14, is metallic cathode 15, which may comprise aluminum, platinum, nickel, chromium, steel, silver, copper, gold, palladium, other Group VIII metals, carbon, graphite, a metalloid, or any other suitable material. However, in a preferred embodiment of the inventive electrode structure, it is preferable to use a metal for metallic cathode 15 which is the same as or comparable in physical and electrical characteristics to the metal of a sample conductive substrate supporting an electrical barrier layer whose thickness is to be measured using the electrode structure 10 of the present invention. For example, where the thickness of layers of aluminum oxide barrier layers on metallic aluminum or aluminum alloy are to be measured, the metallic cathode 15 is preferably also aluminum, of the same alloy composition to minimize effects due to polarization.

In another preferred embodiment of the present invention a platinum cathode is used. That platinum cathode is stable in the electrolyte and does not produce superficial oxides, thereby eliminating variations in potentials with respect to time or use. As a result the potential difference between the platinum cathode and the metal of the substrate sample whose barrier layer is to be measured, may be initially calculated and incorporated into a constant barrier layer conversion factor, as discussed below herein.

The electrolyte 14 in the present invention may comprise virtually any liquid capable of conducting ions. The electrolyte should also preferably not dissolve the sample conductive substrates or electrical barrier layers on such substrates, the thickness of which layer is being measured. Suitable electrolytes include solutions of d-tartaric acid, isopropyl alcohol, sodium formate, sodium chloride, potassium iodide, other halides of light metals, mixtures thereof, or other suitable materials which dissociate into ions. The barrier layer conversion factor discussed below herein is a function of the particular electrolyte used, and would have to be calculated, or calibrated from known barrier layer conversion factors. The pH of the electrolyte may be either acidic or basic, ranging from about 2 to about 12 in various systems. When aluminum electrodes are used, the pH is preferably in the range of about 5.0 to about 9.0.

FIG. 1 also illustrates the electrode structure 10 in contact with a sample 16 comprising conductive substrate 17 having barrier layer 18 on the surface thereof, the thickness of barrier layer 18 of course being considerably exaggerated, with respect to the thickness of conductive substrate 17, simply for the purposes of illustration. Barrier layers of the type usually measured by the system of the present invention are usually of a thickness in the range of 10-100A thick, but may be 5000A thick, or more.

Figure 2:
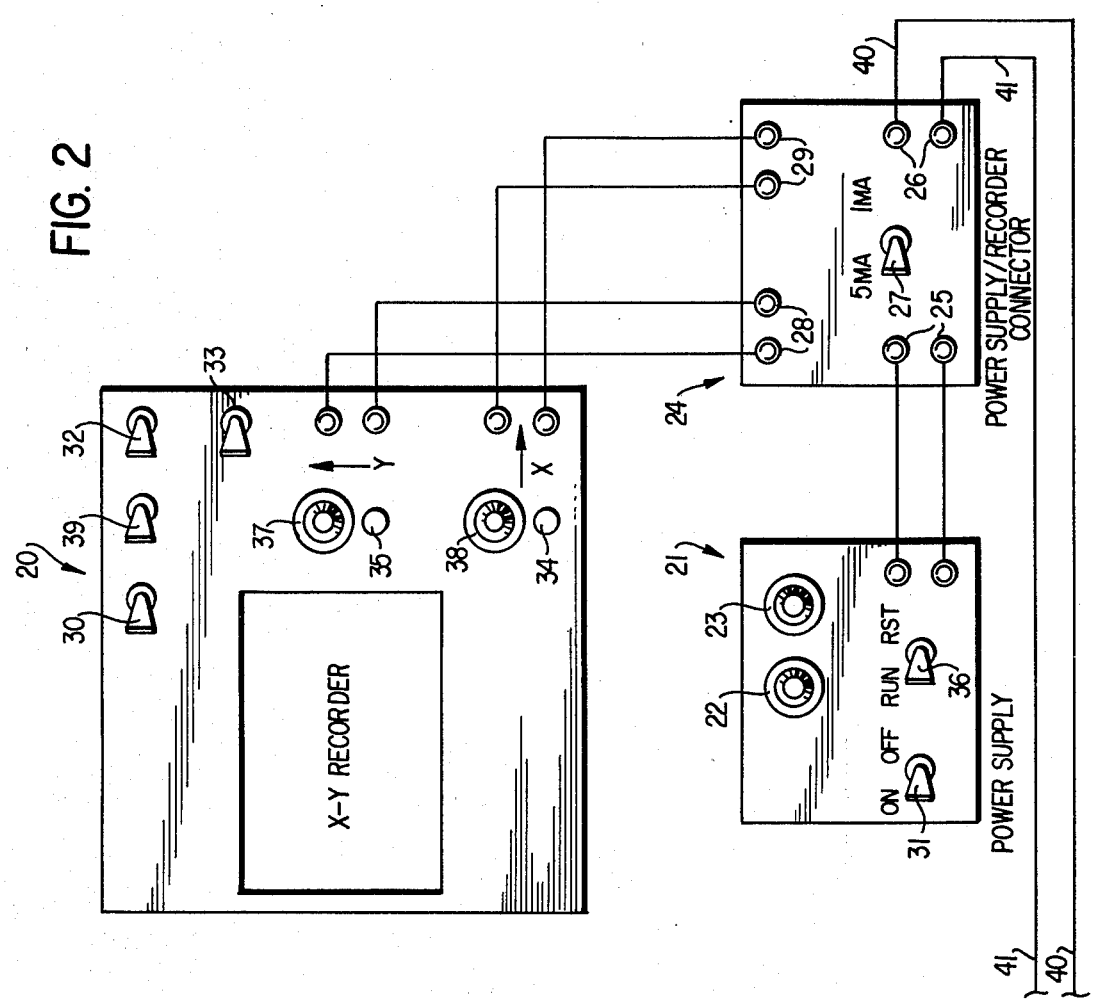
FIG. 2 is a schematic, block diagram illustrating means for supplying power to the electrode measuring system illustrated in FIG. 1, and also illustrating means for recording current as a function of voltage applied to that system.

The electrode structure described in conjunction with FIG. 1, is used with other apparatus, as schematically illustrated in FIG. 2, for measuring the thickness of electrical barrier layers on conductive substrates. The apparatus of FIG. 2 comprises an X-Y recorder 20, a D.C. power supply 21, which includes a scan rate potentiometer 22, and a maximum output potentiometer 23, and a power supply/recorder connecting device 24 through which the power supply, X-Y recorder, and electrode structure 10, are connected and coordinated. The connecting device 24 includes a voltmeter whose output is demonstrated and recorded in the Y-direction by the X-Y recorder, whose Y-direction attenuator 37 is connected to voltage-monitor terminals 28. Those voltage-monitor terminals are the output of a voltmeter circuit, which might ordinarily be monitored by a needle and dial guage voltmeter. The connecting device 24 also includes an ammeter, whose output is demonstrated and recorded in the X-direction by the X-Y recorder, whose X-direction attenuator 38 is connected to current-monitor terminals 29. The current-monitor terminals 29 are the output of an ammeter circuit which might ordinarily be monitored by a needle and dial guage ammeter.

When the power supply and X-Y recorder system are connected as illustrated in FIG. 2, and calibrated, the electrode structure 10 of FIG. 1 is then connected to the sample connection terminals 26 which in effect combine the apparatus shown in FIG. 1 with that of FIG. 2, wherein the sample 17 whose barrier layer thickness is to be measured is connected as an anode to the positive terminal 26 by a conductor 40, and the cathode 15 of the inventive electrode structure 10 is connected to the negative pole 26 by another conductor 41. Then the rubber tip 12 of the electrode structure 10 is placed in contact with the barrier layer surface 18 of the sample 17, with capillary opening 13 being in position so that electrolyte 14 can make electrical contact with barrier layer 18. In various embodiments this may involve placing a small drop of electrolyte on the surface of the barrier layer 18 before applying the rubber tip 12 of electrode 10, or the capillary opening 13 may be sufficiently large so that the tip 12 of electrode structure 10 may simply be placed in contact with the barrier layer 18 without the addition of a drop of electrolyte solution. In either case, the object is of course to complete electrical contact between the electrolyte 14 in the electrode structure 10 and the barrier layer 18.

Figure 3:
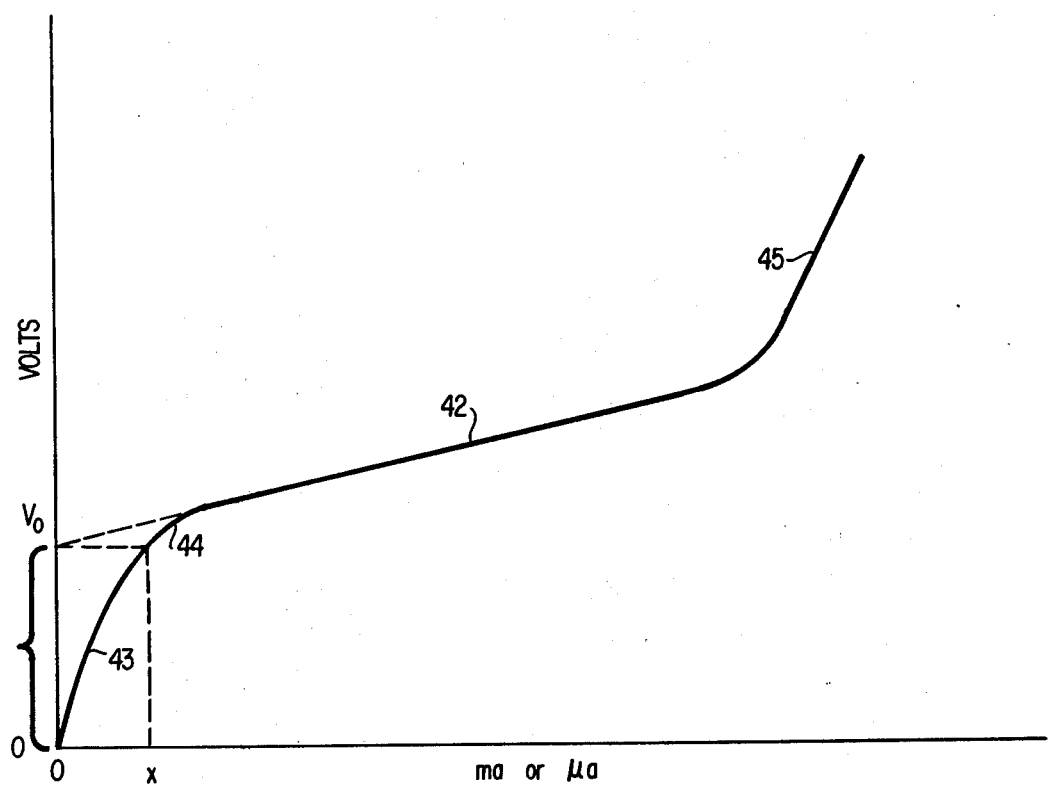
FIG. 3 is a schematic graph showing a curve representative of the type of data typically produced when the electrode system of the present invention is used to measure the thickness of layers on conductive substrates.

The aforementioned scan rate potentiometer then causes the voltage applied to the system to increase from zero, preferably at a linear rate, and the X-Y recorder records the voltage and the corresponding amperage by tracing a curve, which curves may typically have the general shape of the curve shown in FIG. 3. A more detailed explanation of the use of apparatus like that illustrated in FIGS. 1 and 2 is given in the specific example below herein. As soon as the curve is complete, the stylus-like electrode structure 10 may be lifted from the surface of the sample 17, and is immediately ready for re-use in measuring the thickness of a barrier layer on another sample, or on an adjacent area of the same sample.

The ease with which the stylus-like electrode structure 10 may be applied, used for collecting the desired data, and removed from a sample, and immediately re-used for the same purpose with respect to other samples, provides significant advantages over the cumbersome processes of the prior art. In addition to being a much cleaner and quicker system for measuring the thickness of barrier layers on conductive substrates, it has also been found that it is unnecessary to clean the cathode (15 in FIG. 1) after each test reading, and indeed such cathodes need only be cleaned about once a day rather than after each test use. The electrolyte may be re-used over a period of at least about one week. Of course care should be taken to store the electrolyte in a closed container to prevent evaporation and changes in pH and concentration. When the cathode itself is not in use, it preferably should be stored immersed in electrolyte.

In addition to the advantages in the apparatus itself and its easy use, the present invention provides a test method which is virtually non-destructive to the barrier layers and conductive substrates on which it is used. In former methods the physical and electrical characteristics of samples immersed as anodes in electrolyte, or at least the area thereof upon which a relatively large volume of electrolyte was applied, were typically so changed that the sample had to be discarded after testing. But the present invention provides a system in which only a minute area of the sample being tested need be in contact with the electrolyte. While the measuring process does produce an anodic oxide, the electrolyte is preferably selected to do minimal harm to the sample. This particularly facilitates measuring of barrier layers for example on conductive substrates for xerographic plates where the photoconductor may or may not be applied.

Before discussing how the actual thickness of a barrier layer is determined from the voltage-current curve, (like FIG. 3) resulting from use of the present invention, it is useful to review the background information upon which the method is based. As Hunter and Fowle, supra said, referring specifically measuring the thickness of oxide barriers on aluminum substrates using a specific electrolyte: "This method is based on oxide forming characteristics in electrolytes that do not dissolve the oxide. Here, oxide forms anodically to the 14 A/v value, and thickness can be increased only by increasing voltage. By the same token, if any anodic voltage less than the formation voltage is applied, only leakage current will flow. If gradually increasing voltage is applied to this nonporous barrier type of coating in an electrolyte which does not exert significant solvent action, values up to and including the forming voltage will produce only leakage current. Any value above the formation voltage will produce current flow greater than the leakage value, as the coating tends to form to the thickness corresponding to the higher voltage." * * *

"An approximation of barrier layer thickness on an oxide coated sample may be made by observing current flow with increasing voltage in an electrolyte that forms a barrier type of coating. As voltage is increased, the leakage current rises very slowly until the voltage corresponding to the thickness of the barrier is approached. Once appreciable current starts to flow, small voltage increments produce large increases in current. The approximate thickness in Angstrom units of the barrier layer is 14 times the highest voltage that does not produce a pronounced rise in current flow." * * *

"A more accurate value for the thickness of the barrier layer may be determined by taking into account the leakage current for the material under investigation." * * *" J. Electrochem. Soc., Sept., 1954, p. 482.

It is clear that the thickness of electrical barrier layers measured by the present system are a function of the highest applied voltage which does not result in significant increases in current flow through the system which includes the electrode structure of the present invention. While for various conductor samples, the nature of the proportionality, and the barrier layer conversion factor K may vary, for aluminum, it has been found that the barrier layer conversion factor is approximately 14 Angstroms per volt, when the electrolyte used is ammonium tartarate.

Data curves of the type indicated in FIG. 3 not only indicate the current flow in the system as voltage increases, but also provide an accurate approximation of the thickness of the barrier layer. In order to determine the thickness of the barrier layer, the plateau portion 42 of the curve is extrapolated back to the Y axis, that extrapolation intersecting the Y axis at a voltage value $V_0$ and the electrical barrier layer thickness T is then simply determined by multiplying the barrier layer conversion factor K times the voltage $V_0$. For example, if measurement of an aluminum oxide barrier layer on an aluminum sample provided a curve which extrapolated to a value $V_0 = 2$ volts, the measured thickness of the barrier layer would be 2 volts times 14 Angstroms per volt, giving a barrier layer thickness of 28 Angstroms. Another method for routine measurement of $V_0$ is to read the voltage obtained at a predetermined standard amperage. This latter method provides a measure of the effective barrier layer thickness before the predetermined current value is reached.

While it has been indicated that a more exact value for barrier layer thickness can be determined by taking into consideration the leakage current for the particular material under investigation, in many applications that will be unnecessary, and simply extrapolating the plateau portion of the curve back to $V_0$ (back to the Y axis) provides an approximation of barrier layer thickness which is quickly obtained and particularly useful when thicknesses determined by this same method are compared with each other. However, the leakage current may be obtained by extrapolating $V_0$ back onto the data curve, and reading the corresponding current $\chi$ on the X-axis, as shown in FIG. 3. Then by knowing the effective surface area being measured, the leakage current may be approximated. In addition to the plateau portion 42, the curve of FIG. 3 shows a steeply increasing initial portion 43 which ends in the plateau 42 at a knee or inflection portion 44. This initial steep portion 43 of the curve simply shows that before reaching any voltage level where additional material may be anodically formed on a sample being tested, the applied voltage produces only leakage currents. Curves such as those shown in FIG. 3 may also include a steeply sloped terminal portion 45, the cause of which is not clearly known. It may be that there is an additional contaminant film, or a second type of barrier layer present, which is detectable at higher voltages than those which illustrate the thickness of the primary barrier layer to which the present invention is directed. The thickness of these primary barrier layers is indicated at the first knee 44 and plateau 42 in curves such as those illustrated in FIG. 3. Where various different samples are tested under various different conditions such as using different cathode materials, different electrolytes, or applying the increasing voltage at a different rate, the specific shapes of the resultant curves will be different, but such curves will in general illustrate a first plateau 42 which occurs after a steeply sloped initial portion 43 which ends at a knee 44. While at higher values steeply sloped portions 45, and even higher value plateaus, may occur in various systems if the applied voltage is allowed to continue to increase, it is the initital plateau 42 which provides the result sought in the present invention.

As indicated previously herein, it is preferable to provide an electrode structure wherein the cathode material is of the same material as the samples whose barrier layer thickness is being measured. This of course provides a system wherein little or no correction need be made for the different oxidation potentials of the material involved. However where it is not feasible to provide a cathode of the same material as the sample, it is preferred to use a platinum cathode, and then take into consideration the difference in oxidization potential due to the different material of the sample whose barrier layer thickness is being measured.

The following example further specifically defines the electrode system for measuring the thickness of layers on conductive substrates in accordance with the present invention. The parts and percentages are by weight unless otherwise indicated. The example below is intended to illustrate a preferred embodiment of the novel electrode system of the present invention.

EXAMPLE

An electrode structure according to the present invention is prepared by providing a piece of glass tubing of inside diameter less than about one fourth inch, and having a length between 3 and 5 inches, and placing on one end of that tubing a rounded tip of silicone rubber, comprising General Electric RTV-21 silicone rubber molding compound, cured with General Electric RTV-9811 paste catalyst. The rubber tip also has a capillary opening in the end thereof that opening being less than about 1/64 inch in diameter. Inserted into the glass tubing from the end opposite the end enclosed by the silicone rubber tip, is a metallic aluminum cathode. The aluminum cathode may comprise a quite pure (at least 99.99 percent) aluminum such as Alloy 1,199 available from Alcoa.

An electrolyte comprising an about 3% solution of tartaric acid is prepared by dissolving about 6 grams of d-tartaric acid in about 150 milliliters distilled water, and adjusting the pH of the solution to about 5.5 with about 50% ammonium hydroxide, the dilute solution of ammonium hydroxide being used in order to have more precise control over the pH. The 3% tartaric acid electrolyte is placed inside the cathode electrode structure described above, but before the electrolyte is placed therein, the aluminum cathode is cleaned by placing it for about 1 minute in an about 15% sodium hydroxide solution prepared by dissolving about 30 grams of sodium hydroxide in about 170 milliliters of de-ionized or distilled water, whereafter the aluminum cathode is placed for about 1 minute in an about 50% nitric acid solution prepared by adding about 100 milliliters of concentrated nitric acid to about 100 milliliters of de-ionized water, and the aluminum cathode is finally rinsed twice for a duration of about 15 seconds each, with de-ionized water. The electrolyte is then placed within the tube having one end thereof closed by the silicone rubber tip, and the clean aluminum cathode is inserted therein.

Apparatus for providing power to the electrode cell and for recording current flow through the cell as a function of applied voltage, are set up in an arrangement similar to that illustrated in FIG. 2. The X-Y recorder 20 comprises a Houston X-Y recorder, type HR-95 having type 8,600 pens, including Houston No.

VD 202 and VD 203 attenuators, and a Houston No. 81,015H chart paper recorder, all available from Houston Omnigraphic Corp., c/o Doolittle Electronics, Fayettville, New York. The power supply 21 is a 60-volt power supply including a scan rate (slope) potentiometer 22, and maximum output potentiometer 23, both of which preferably should be linear. The system also includes a power supply/recorder connecting device 24 which includes power input terminals 25, sample connection terminals 26, and a 1ma–5ma calibration switch 27. The Y-direction attenuator 37 of the X–Y recorder is connected to the connector 24 through voltage-monitor termianls 28, and the X-direction attenuator 38 of the X–Y recorder is connected to the connector 24 through current-monitor terminals 29.

The X–Y recorder and 60-volt power supply are calibrated by turning on both the recorder (motor switch 39) and power supply, and allowing them to warm up for about 15 minutes. Graph paper, such as Keuffel & Esser Co. 20 × 20 to the inch, No. 46-1,242 graph paper, 7 × 10 inches, is inserted into the recorder and held in place by a vacuum system operated by switch 32. The pen is placed in a down position by operator pen lift switch 33 and the pen zeroed with the X and Y zero adjust knobs 34 and 35, respectively. The scan rate is set by adjusting the scan rate potentiometer 22 to a setting of 1 volt per minute (although it may be set at about 1–50 v/min as desired), which scan rate may be checked with a stop watch. Scanning is then begun with the run-reset switch 36 of the power supply, and the maximum output potentiometer 23 is set to 20 volts. The output may be checked with a voltmeter. The maximum output having been set, the Y-attenuator 37 is used to adjust the pen to the maximum Y-scale on the graph paper. Then using the calibration switch 27 in the power supply/recorder connector 24, as well as X-attenuator 38, the X-axis is calibrated for 20ma at full scale. As mentioned previously, the calibration switch is labeled 1ma–5ma for calibrating at 10 volts. At 20 volts those values are 2ma–10ma, respectively. Hence, if one desired 20ma at 20 volts, full scale, the calibration switch is held at 5 ma and the X-attenuator is adjusted to the middle of the X-axis (10ma). After the aforementioned calibrations with the X and Y attenuators, the pen is reset to zero, the instruments then being calibrated for 20 volts-20ma at a scan rate of 50 volts per minute.

The instruments having been calibrated as described above, a new piece of graph paper is placed in the recorder with the pen switch 33 in the load position, whereafter the vacuum switch 32 is switched on to hold the paper in position while the pen switch 33 is in the up position. The pen switch is then placed in the down position. A sample of metallic aluminum substrate is then electrially connected, for example by a wire having an alligator slip at one end thereof for attachment to the aluminum substrate, the other end of which is attached to the positive sample terminal of the power/recorder connector 24. This wire is represented by reference number 40 in FIG. 1 and is connected to one of the terminals 26 in FIG. 2. Similarly, another wire connects the cathode 15 to the negative sample connection pole of the power supply/recorder connector device 24, that wire being illustrated at numeral 41 in FIG. 1 and connected to the negative terminal 26 in FIG. 2. The cathode electrode structure is then placed with its silicone rubber tip, 12 as illustrated in FIG. 1, having a capillary orifice 13 therein, in contact with the surface of the aluminum substrate upon which there is an oxide barrier layer whose thickness is to be measured. The cathode structure (10 as shown in FIG. 1) can simply be held in the hand like a stylus, with the silicone rubber tip thereof in contact with the barrier layer containing surface of the aluminum substrate. Upon completion of the circuit by contacting the tip of the cathode structure having the capillary orifice therein to the surface of the aluminum substrate sample, the circuit is placed in operation, and the X–Y recorder traces a line thereby recording the relationship of voltage and current through the cathode and sample-cum-anode. When the trace is completed, the pen switch should be placed in up position, and the return power supply switch to reset. Of course if the pen runs off the vertical axis before it has completed the knee and plateau portion of the curve, it is necessary to recalibrate the X–Y recorder and power supply for a greater voltage (Y) scale. The completed graph is removed after turning off the vacuum switch 32 and placing the pen in the load position. If desired, the same sheet of graph paper may be used for several traces so that they may readily be compared.

The plateau portion of the curve is then extrapolated back to the Y-axis (i.e. to 0 ma) and the extrapolated voltage is then multiplied by the appropriate conversion constant to give the approximate electrical barrier layer thickness.

Although specific components, proportions and arrangements of elements have been stated in the above description of preferred embodiments of this invention, other equivalent components and arrangements of elements may be used with satisfactory results and various degrees of quality, or other modifications may be made herein to synergize or enhance the construction of the invention to thereby increase its utility. It will be understood that such changes of details, materials, arrangements of parts, and uses of the invention described and illustrated herein, are intended to be included within the principles and scope of the claimed invention.

What is claimed is:

1. An electrode structure consisting essentially of:
   a hollow tube of substantially electrically insulating material;
   a tip portion of substantially electrically insulating material closing one end of said tube, with a capillary orifice with a diameter less than about 1/16 of an inch extending through the thickness of said tip portion;
   a piece of electrode material extending into said tube from the end opposite said tip portion;
   an electrolyte which is nondestructive to a layer the thickness of which is to be measured and selected from the group consisting of tartaric acid, isopropyl alcohol, sodium formate, sodium chloride, potassium iodide, other halides of light metals and mixtures thereof within said tube and said tip portion, with the piece of electrode material extending into said electrolyte.

2. The electrode structure of claim 1 wherein said capillary orifice is of a diameter of not greater than about 1/64 of an inch.

3. The electrode structure of claim 1, wherein said tube comprises relatively rigid material, and said tip portion comprises relatively flexible material.

4. The electrode structure of claim 3, wherein said tip portion comprises silicone rubber.

5. The electrode structure of claim 1, wherein said electrode material comprises aluminum.

6. The electrode structure of claim 1, wherein said electrode material comprises platinum.

7. The electrode structure of claim 1, wherein said electrode material comprises a material selected from the group consisting of: nickel, chromium, silver, copper, steel, gold, palladium or other Group VIII metals, carbon, or graphite.

8. The electrode structure of claim 1, wherein the electrolyte comprises a liquid having a pH in the range of about 2 to about 12.

9. The electrode structure of claim 5, wherein the electrolyte comprises a liquid having a pH in the range of about 5.0 to about 9.0.

10. Apparatus for measuring the thickness of an electrical barrier layer on a conductive substrate, consisting essentially of:
providing an electrode structure consisting essentially of:
a hollow tube of substantially electrically insulating material;
a tip portion of substantially electrically insulating material closing one end of said tube, with a capillary orifice of a diameter less than about 1/16 of an inch extending through the thickness of said tip portion;
a piece of electrode material extending into said tube from the end opposite said tip portion;
an electrolyte which is nondestructive to a layer the thickness of which is to be measured and selected from the group consisting of tartaric acid, isopropyl alcohol, sodium formate, sodium chloride, potassium iodide, other halides of light metals, and mixtures thereof within said tube and said tip portion, with the piece of electrode material extending into said electrolyte;
a DC power supply, including means for increasing voltage per unit time, the negative pole of said supply being electrically connected to the piece of electrode material of said electrode structure, and means connected to the positive pole of said power supply for contacting a sample conductive substrate;
a voltmeter circuit connected for measuring the voltage provided to said electrode structure;
an ammeter circuit connected for measuring the current flow through said electrode structure;
an X–Y recorder connected to the output of said voltmeter circuit and to the output of said ammeter circuit for simultaneously recording said current as a function of said voltage.

11. The apparatus of claim 10, additionally comprising a sample conductive substrate in electrical contact with said means for contacting such a sample.

12. The apparatus of claim 11, wherein the tip portion of the electrode structure is in contact with the surfaces of said sample upon which there is a barrier layer whose thickness is to be measured, and the electrolyte is in electrical contact with said barrier layer through the capillary orifice in said tip portion.

13. The apparatus of claim 12, wherein the piece of electrode material in the electrode structure, and the sample conductive substrate, comprise the same material.

14. The apparatus of claim 10, wherein said piece of electrode material is a material selected from the group consisting of: aluminum, platinum, nickel, chromium, silver, copper, steel, gold, palladium or other Group VIII metals, carbon or graphite.

15. A method of measuring the thickness of an electrical barrier layer on a conductive substrate, consisting essentially of:
providing an electrode structure consisting essentially of:
a hollow tube of substantially electrically insulating material;
a tip portion of substantially electrically insulating material closing one end of said tube, with a capillary orifice of a diameter less than about 1/16 of an inch extending through the thickness of said tip portion;
a piece of electrode material extending into said tube from the end opposite said tip portion;
an electrolyte which is nondestructive to a layer the thickness of which is to be measured and selected from the group consisting of tartaric acid, isopropyl alcohol, sodium formate, sodium chloride, potassium iodide, other halides of light metals, and mixtures thereof within said tube and said tip portion, with the piece of electrode material extending into said electrolyte;
placing the tip portion of the electrode structure in contact with the surface of a sample conductive substrate upon which there is a barrier layer whose thickness is to be measured, so that there is electrical contact between the electrolyte in said electrode structure and said barrier layer, through the capillary orifice in the tip portion of said electrode structure;
connecting the electrode material of said electrode structure to the negative terminal of a DC power supply and connecting the conductive substrate to the positive terminal of said DC power supply;
increasing the voltage from zero incrementally per unit time and simultaneously measuring said voltage and the current through said electrode structure, for thereby determining the highest voltage that does not produce a pronounced increase in current flow, which highest voltage is proportional to the thickness of said barrier layer.

16. The method of claim 15, wherein said voltage and current are simultaneously measured and plotted in graphic form by an X–Y recording device.

* * * * *

UNITED STATES PATENT AND TRADEMARK OFFICE
CERTIFICATE OF CORRECTION

PATENT NO. : 3,975,681
DATED : August 17, 1976
INVENTOR(S) : Dominic J. Angelini, Philip G. Perry It is certified that error appears in the above-identified patent and that said Letters Patent are hereby corrected as shown below:

Column 1, line 24, delete "photo-conductive" and insert --photoconductive--.

Column 2, line 37 after "substrate", delete the comma "," and insert a period --.--.

Column 8, line 38, delete "Alloy 1,199" and insert --Alloy 1199--.

Column 9, line 13, delete "termianls" and insert --terminals--.

Signed and Sealed this

Ninth Day of November 1976

[SEAL]

Attest:

RUTH C. MASON
Attesting Officer

C. MARSHALL DANN
Commissioner of Patents and Trademarks